United States Patent
Ganai

(10) Patent No.: US 12,530,513 B2
(45) Date of Patent: Jan. 20, 2026

(54) INTELLIGENT REPLAY OF SIMULATION ON MODIFIED CONSTRAINT RANDOM TESTBENCH

(71) Applicant: Synopsys, Inc., Sunnyvale, CA (US)

(72) Inventor: Malay Ganai, San Jose, CA (US)

(73) Assignee: Synopsys, Inc., Sunnyvale, CA (US)

( * ) Notice: Subject to any disclaimer, the term of this patent is extended or adjusted under 35 U.S.C. 154(b) by 0 days.

(21) Appl. No.: 18/743,683

(22) Filed: Jun. 14, 2024

(65) Prior Publication Data
US 2025/0384195 A1 Dec. 18, 2025

(51) Int. Cl.
*G06F 30/33* (2020.01)
*G06F 30/3308* (2020.01)
*G06F 30/333* (2020.01)

(52) U.S. Cl.
CPC ........ *G06F 30/333* (2020.01); *G06F 30/3308* (2020.01)

(58) Field of Classification Search
None
See application file for complete search history.

(56) References Cited

U.S. PATENT DOCUMENTS

2017/0193375 A1* 7/2017 Bitar .................. G06F 40/117

OTHER PUBLICATIONS

Reddy, Taruna, "Increasing IP and SoC Debug Efficiency 10X with Intelligent Waveform Reuse," Synopsys, White Paper, Dec. 2021, available at https://www.synopsys.com/cgi-bin/verification/dsdla/pdfr1.cgi?file=verdi-idx-wp.pdf.
Reddy, Taruna, "Intelligent Waveform Replay for Efficient Debug," Semiconductor Engineering, Feb. 24, 2022.
Wikipedia Contributors, "Diff", Wikipedia, The Free Encyclopedia, May 22, 2024, last accessed Jun. 13, 2024.
Wikipedia Contributors. "Sequence alignment." Wikipedia, The Free Encyclopedia. Wikipedia, The Free Encyclopedia, Apr. 6, 2024, last accessed Jun. 13, 2024.

* cited by examiner

*Primary Examiner* — Scott C Sun
(74) *Attorney, Agent, or Firm* — Davenport IP Law, PLLC

(57) ABSTRACT

In an example, a pre-solution state and other attributes of each constraint problem (CP) in a first series of constraint problems (CPs) solved by a constraint solver are recorded during a first simulation run with a first testbench. The recorded attributes are mapped to at least one key value set of a plurality of key value sets. Each key value set uses a different level of generalization to represent the recorded attributes. A matching CP from the first series is determined for each CP in a second series of CPs to be solved during a second simulation run with a second testbench. The matching CP is mapped to a key value set that uses a lower level of generalization to represent the matching CP's recorded attributes relative to other key value sets. A pre-solution state of each CP in the second series is set to that of the matching CP.

20 Claims, 16 Drawing Sheets

300

| FUNCTION | DESCRIPTION |
|---|---|
| key_metric(k) | MAPS A KEY k TO A METRIC INTEGER VALUE (> 0) |
| serial_record(re) | RETURNS RANDOMIZATION SERIAL NUMBER (> 0) OF A RECORDED EVENT RE |
| serial_replay(e) | RETURNS RANDOMIZATION SERIAL NUMBER (> 0) OF A REPLAYED EVENT E |
| consumed_serial_record(s) | RETURNS TRUE IFF RANDOMIZED SERIAL NUMBER S OF THE RECORDED TRACE IS ALREADY MAPPED |
| consumed_event_record(k, re) | RETURNS TRUE IFF RESTORED EVENT RE IS ALREADY MAPPED USING KEY k |
| next_repeat_record(re) | RETURNS NEXT REPEAT EVENT OF THE CONSTRAINT PROBLEM CORRESPONDING TO THE EVENT RE IN THE RECORDED TRACE |
| same_serial_replay(e) | RETURNS TRUE IFF serial_replay(e) IS THE SAME AS THAT OF THE LAST EVENT IN THE REPLAY TRACE |
| current_matched_event(p) | RETURNS RESTORED EVENT CURRENTLY MATCHED TO THE CONSTRAINT PROBLEM P IN THE REPLAY TRACE |
| RNG_state_copy(e, re) | OVERRIDES THE RNG STATE OF THE REPLAYED EVENT E WITH THAT OF RECORDED EVENT RE |
| KEY FUNCTION | ONE OF r KEY FUNCTIONS k_1, ..., k_r SUCH THAT key_metric(k_i) >= key_metric(k_j) FOR i < j |

FIG. 3

```
def isr_mlm():
    initialize()
    for each replay event e:
        isr_restore(e)
```

FIG. 4A

```
def initialize():
    for each recorded event re in [re_1, ..., re_m]:
        for each key k_j in [k_1, ..., k_r]:
            //insert key=k_j(re) and value=append re in map_j
            map_j.insert(<k_j(re), map_j[k_j(re)].append{re}>)
    for each serial s in [1, .., max]:
        consumed_serial_record(s) := false
```

FIG. 4B

```
def isr_restore(e):
    re = find_matching_event (e)
    if re != null:
        RNG_state_copy(e, re)
```

FIG. 4C

```
def find_matching_event(e):
   p = problem(e)
   if current_matched_event(p) == null:
      current_matched_event(p) := find_matching_event_first_time(e)
   else:
      current_matched_event(p) := next_repeat_record(current_matched_event(p))
   return current_matched_event(p)
```

FIG. 4D

```
def find_matching_event_first_time(e):

if not same_serial_replay(e): //reset the matching state variables
      last_match_serial := 0
      last_match_key_metric := 0
   re := null
   for each k_j in [k_1, k_2, ..., k_r]:
      if re == null and k_j(e) is a member of map_j:
         //obtain re from the ordered list map_j[k_j(e)] if possible, else return null
         re := first event f s.t. consumed_event_record(k_j, f) == false and one of (a)–(c) holds:
                  (a) same_serial_replay(e) == true AND
                      key_metric(k_j) < last_match_key_metric AND
                      serial_record(f) == last_match_serial
                  (b) same_serial_replay(e) == true AND
                      key_metric(k_j) >= last_match_key_metric AND
                      (serial_record(f) == last_match_serial OR
                      consumed_serial_record(serial_record(f)) == false)
                  (c) same_serial(e) == false AND
                      consumed_serial_record(serial_record(f)) == false if re != null:
      if (last_match_key_metric < key_metric(k_j)):
         last_match_serial := serial_record(re)
         last_match_key_metric := key_metric(k_j)
         consumed_serial_record(serial_record(re)) := true
         consumed_event_record(k_j, re) := true
      else:
         last_match_serial := 0
         last_match_key_metric := 0
   return re
```

FIG. 4E

| KEY FUNCTION | $K\_j: e \rightarrow$ TUPLE | Key_metric |
|---|---|---|
| K_1 | <file,line,class,probSig,varSig> | 5 |
| K_2 | <*,line,class,probSig,varSig> | 4 |
| K_3 | <file,*,class,probSig,varSig> | 4 |
| K_4 | <*,*,class,probSig,varSig> | 4 |
| K_5 | <file,line,class,*,varSig> | 3 |
| K_6 | <*,line,class,*,varSig> | 3 |
| K_7 | <file,*,class,*,varSig> | 3 |
| K_8 | <*,*,class,*,varSig> | 3 |
| K_9 | <file,line,class,probSig,*> | 3 |
| K_10 | <*,line,class,probSig,*> | 3 |
| K_11 | <file,*,class,probSig,*> | 3 |
| K_12 | <*,*,class,probSig,*> | 3 |
| K_13 | <file,line,class,*,*> | 2 |
| K_14 | <*,line,class,*,*> | 2 |
| K_15 | <file,*,class,*,*> | 2 |
| K_16 | <*,*,class,*,*> | 1 |

FIG. 5

| 610 | | 620 | |
|---|---|---|---|
| origTB/test.sv | | modTB/test.sv | |
| 1 | class tb1; | 1 | class tb1; |
| | | 2 + | //added a new var d |
| | | 3 + | rand int d; |
| 2 | rand bit [9:0]a; | 4 | rand bit [9:0]a; |
| 3 | rand int b;        612 | 5 | rand int b;        622 |
| 4 | constraint C1 { b < 10;} | 6 | constraint C1 { b < 10;} |
| 5 | endclass | 7 | endclass |
| 6 | class tb2 | 8 | class tb2 |
| 7 | rand int c; | 9 | rand int c; |
| 8 | rand int d; | 10 | rand int d; |
| 9 | constraint C2 { c < 20;} | 11 | constraint C2 { c < 20;} |
| 10 | endclass | 12 | endclass |
| 11 | | 13 | |
| 12 | module test; | 14 | module test; |
| 13 | tb1 t1; | 15 | tb1 t1; |
| 14 | tb2 t2; | 16 | tb2 t2; |
| 15 |               616 | 17 | |
| 16 | initial begin | 18 | initial begin |
| 17 | t1=new( ); | | |
| 18 | t2=new( ); | 19 | t2=new( ); |
| | | 20 + | t1=new( ); |
| | | 21 + | |
| | | 22 + | //reordered t2 and added with constraints |
| | | 23 + | repeat(3)begin |
| | | 24 + | t2.randomize( ) with { c < 15;}; |
| | | 25 + | $display("t2.c = %d",t2.c); |
| | | 26 + | $display("t2.d = %d",t2.d); |
| | | 27 + | end |
| | | 28 + | |
| 19 | repeat(3)begin | 29 | repeat(3)begin |
| 20 | t1.randomize( );   616 | 30 | t1.randomize( );   624 |
| 21 | $display("t1.a = %d",t1.a); | 31 | $display("t1.a = %d",t1.a); |
| 22 | $display("t1.b = %d",t1.b); | 32 | $display("t1.b = %d",t1.b); |
| 23 | end | 33 | end |
| 24 ! | repeat(3)begin | 34 ! | |
| 25 ! | t2.randomize( ); | ! | |
| 26 ! | $display("t2.c = %d",t2.c); | ! | |
| 27 ! | $display("t2.d = %d",t2.d); | ! | |
| 28 ! | end | ! | |
| 29 | end | 35 | end |
| 30 | endmodule;     616 | 36 | endmodule; |
| 31 | | 37 | |

| | | 615B | | 625B |
|---|---|---|---|---|
| 1 | | t1.a = 953 | 1 | t1.a = 953 |
| 2 | | t1.b = -1424580859 | 2 | t1.b = -1424580859 |
| 3 | | t1.a = 91 | 3 | t1.a = 91 |
| 4 | | t1.b = -258559312 | 4 | t1.b = -258559312 |
| 5 | | t1.a = 826 | 5 | t1.a = 826 |
| 6 | | t1.b = -1339238652 | 6 | t1.b = -1339238652 |
| 1 | ! | t2.c = -1122839331 | 1 | ! t2.c = -923382401 |
| 2 | | t2.d = -1559125241 | 2 | t2.d = -1559125241 |
| 3 | ! | t2.c = -898349146 | 3 | ! t2.c = -1781459128 |
| 4 | | t2.d = 1143679858 | 4 | t2.d = 1143679858 |
| 5 | ! | t2.c = -1823937254 | 5 | ! t2.c = -1709448058 |
| 6 | | t2.d = 834617086 | 6 | t2.d = 834617086 |

FIG. 6B

|   | 615C | | 625C |
|---|---|---|---|
| 1 | ! t1.a = 953 | 1 | ! t1.a = 532 |
| 2 | ! t1.b = -1424580859 | 2 | ! t1.b = -1122839335 |
| 3 | ! t1.a = 91 | 3 | ! t1.a = 726 |
| 4 | ! t1.b = -258559312 | 4 | ! t1.b = -898349151 |
| 5 | ! t1.a = 826 | 5 | ! t1.a = 1016 |
| 6 | ! t1.b = -1339238652 | 6 | ! t1.b = -1823937256 |
| 1 | ! t2.c = -1122839331 | 1 | ! t2.c = -1698862954 |
| 2 | ! t2.d = -1559125241 | 2 | ! t2.d = -384116807 |
| 3 | ! t2.c = -898349146 | 3 | ! t2.c = -852579469 |
| 4 | ! t2.d = 1143679858 | 4 | ! t2.d = 1637914715 |
| 5 | ! t2.c = -1823937254 | 5 | ! t2.c = -547180480 |
| 6 | ! t2.d = 834617086 | 6 | ! t2.d = 397247290 |

FIG. 6C

| RECORD EVENT # | EVENT ATTRIBUTES <file:line:class:probSig:varSig> | serial_record |
|---|---|---|
| 0 | test.sv:20:tb1:99d1b066e1eb48078636dafe041f9d76:87ac7824 | 1 |
| 1 | test.sv:20:tb1:a:107f86c0 | 1 |
| 2 | test.sv:20:tb1:99d1b066e1eb48078636dafe041f9d76:87ac7824 | 2 |
| 3 | test.sv:20:tb1:a:107f86c0 | 2 |
| 4 | test.sv:20:tb1:99d1b066e1eb48078636dafe041f9d76:87ac7824 | 3 |
| 5 | test.sv:20:tb1:a:107f86c0 | 3 |
| 6 | test.sv:25:tb2:1402d8a6648a6d97a35a1116e1e33d71:a5d1a5c0 | 4 |
| 7 | test.sv:25:tb2:d:d5e8e247 | 4 |
| 8 | test.sv:25:tb2:1402d8a6648a6d97a35a1116e1e33d71:a5d1a5c0 | 5 |
| 9 | test.sv:25:tb2:d:d5e8e247 | 5 |
| 10 | test.sv:25:tb2:1402d8a6648a6d97a35a1116e1e33d71:a5d1a5c0 | 6 |
| 11 | test.sv:25:tb2:d:d5e8e247 | 6 |

FIG. 7

| MAPPING TABLE <j> | KEY=K_j(e) | VALUE=ORDERED EVENT SET |
|---|---|---|
| 1 | test.sv:20:tb1:99d1b066e1eb48078636dafe041f9d76:87ac7824 | {0,2,4} |
|   | test.sv:20:tb1:a:107f86c0 | {1,3,5} |
|   | test.sv:25:tb2:1402d8a6648a6d97a35a1116e1e33d71:a5d1a5c0 | {6,8,10} |
|   | test.sv:25:tb2:d:d:5e8e247 | {7,9,11} |
| ... | ... | ... |
| 3 | test.sv:*:tb1:99d1b066e1eb48078636dafe041f9d76:87ac7824 | {0,2,4} |
|   | test.sv:*:tb1:a:107f86c0 | {1,3,5} |
|   | test.sv:*:tb2:1402d8a6648a6d97a35a1116e1e33d71:a5d1a5c0 | {6,8,10} |
|   | test.sv:*:tb2:d:d:5e8e247 | {7,9,11} |
| ... | ... | ... |
| 7 | test.sv:*:tb1:*:87ac7824 | {0,2,4} |
|   | test.sv:*:tb1:*:107f86c0 | {1,3,5} |
|   | test.sv:*:tb2:*:a5d1a5c0 | {6,8,10} |
|   | test.sv:*:tb2:*:d5e8e247 | {7,9,11} |
| ... | ... | ... |
| 15 | test.sv:*:tb1:*:* | {0,1,2,3,4,5} |
|   | test.sv:*:tb2:*:* | {6,7,8,9,10,11} |
| ... | ... | ... |

FIG. 8A

| REPLAY EVENTS | | | | MAPPING OF REPLAY EVENT TO RECORD EVENT WITH ISR MLM | | | RECORD EVENT ATTRIBUTES | |
|---|---|---|---|---|---|---|---|---|
| REPLAY EVENT # | EVENT ATTRIBUTES <file:line:class:probSig:varSig> | serial_replay | KEY USED | key_metric | MAPPED RECORD EVENT # | | <file:line:class:probSig:varSig> | serial_record |
| 0 | test.sv:24:tb2:571f099b002e222bf57999f1eca00171:a5d1a5c0 | 1 | k_7 | 3 | 6 | | test.sv:25:tb2:1402d8a6648a6d97a35a1116e1e33d71:a5d1a5c0 | 4 |
| 1 | test.sv:24:tb2:d:d5e8e247 | 1 | k_3 | 4 | 7 | | test.sv:25:tb2:d:d5e8e247 | 4 |
| 2 | test.sv:24:tb2:571f099b002e222bf57999f1eca00171:a5d1a5c0 | 2 | k_7 | 3 | 8 | | test.sv:25:tb2:1402d8a6648a6d97a35a1116e1e33d71:a5d1a5c0 | 5 |
| 3 | test.sv:24:tb2:d:d5e8e247 | 2 | k_3 | 4 | 9 | | test.sv:25:tb2:d:d5e8e247 | 5 |
| 4 | test.sv:24:tb2:571f099b002e222bf57999f1eca00171:a5d1a5c0 | 3 | k_7 | 3 | 10 | | test.sv:25:tb2:1402d8a6648a6d97a35a1116e1e33d71:a5d1a5c0 | 6 |
| 5 | test.sv:24:tb2:d:d5e8e247 | 3 | k_3 | 4 | 11 | | test.sv:25:tb2:d:d5e8e247 | 6 |
| 6 | test.sv:30:tb1:99d1b066e1eb48078636dafe0419d76:87ac7824 | 4 | k_3 | 4 | 0 | | test.sv:20:tb1:99d1b066e1eb48078636dafe0419d76:87ac7824 | 1 |
| 7 | test.sv:30:tb1:d:d5e8e247 | 4 | k_15 | 2 | 0 | | test.sv:20:tb1:a:107f86c0 | 1 |
| 8 | test.sv:30:tb1:a:107f86c0 | 4 | k_3 | 4 | 1 | | test.sv:20:tb1:a:107f86c0 | 1 |
| 9 | test.sv:30:tb1:99d1b066e1eb48078636dafe0419d76:87ac7824 | 5 | k_3 | 4 | 2 | | test.sv:20:tb1:99d1b066e1eb48078636dafe0419d76:87ac7824 | 2 |
| 10 | test.sv:30:tb1:d:d5e8e247 | 5 | k_15 | 2 | 2 | | test.sv:20:tb1:a:107f86c0 | 2 |
| 11 | test.sv:30:tb1:a:107f86c0 | 5 | k_3 | 4 | 3 | | test.sv:20:tb1:a:107f86c0 | 2 |
| 12 | test.sv:30:tb1:99d1b066e1eb48078636dafe0419d76:87ac7824 | 6 | k_3 | 4 | 4 | | test.sv:20:tb1:99d1b066e1eb48078636dafe0419d76:87ac7824 | 3 |
| 13 | test.sv:30:tb1:d:d5e8e247 | 6 | k_15 | 2 | 4 | | test.sv:20:tb1:a:107f86c0 | 3 |
| 14 | test.sv:30:tb1:a:107f86c0 | 6 | k_3 | 4 | 5 | | test.sv:20:tb1:a:107f86c0 | 3 |

| BENCH | ORIGINAL TB | | | | MODIFIED TB | | | | |
|---|---|---|---|---|---|---|---|---|---|
| | NO ISR | ISR-RECORD | | PERF PENALTY (%) | NO ISR | | ISR-REPLAY | | PERF PENALTY (%) |
| | SIM TIME (SEC) | SIM TIME (SEC) | #EVENT, DB SIZE (MB) | | SIM TIME (SEC) | # STIMULUS MISMATCH | SIM TIME* (SEC) | # STIMULUS MISMATCH | |
| RTM TB | 53.41 | 53.41 | 34K, 0.46MB | 0 | *COMPLEX*: COMMENT OUT SOME RANDOMIZATION, VAR REORDER. TOTAL NUMBER '<' AND '>' IN DIFF = 106 | | | | |
| | | | | | 53.53 | 0 EXPECTED 39307 UNEXPECTED | 53.48 | 0 EXPECTED 0 UNEXPECTED | 0 |
| OpenTitan AES | 3.22 | 3.27 | 18K, 0.28MB | 1% | *MEDIUM*: NEW VAR, VAR REORDER, MODIFY DIST CONSTRAINTS. TOTAL NUMBER OF '<' AND '>' IN DIFF = 21 | | | | |
| | | | | | 3.19 | 247 EXPECTED 64 UNEXPECTED | 3.3 | 247 EXPECTED 0 UNEXPECTED | 3% |
| OpenTitan HMAC | 3.59 | 3.68 | 33K, 0.5MB | 2.5% | *MEDIUM*: NEW VAR, VAR REORDER, MODIFY DIST CONSTRAINTS. TOTAL NUMBER OF '<' AND '>' IN DIFF = 26 | | | | |
| | | | | | 3.52 | 378 EXPECTED 2228 UNEXPECTED | 3.72 | 378 EXPECTED 0 UNEXPECTED | 5.7% |

FIG. 9

INTELLIGENT REPLAY OF SIMULATION ON MODIFIED CONSTRAINT RANDOM TESTBENCH

TECHNICAL FIELD

The present disclosure relates generally to simulating operation of a hardware design under test (DUT) and particularly, to reproducing events of interest observed during the simulation and functional verification of the DUT with a constrained random testbench.

BACKGROUND

Testing a hardware design, such as an integrated circuit (IC) or a system-on-chip (SoC), can be an arduous and time-consuming process, particularly as the complexity of the design under test (DUT) increases. The design is commonly thoroughly tested to ensure functionality, specifications, and reliability. The importance of these tests prior to tape out and fabrication is significant as the costs and complexity of tape out and fabrication are substantial. Fabricating an IC or SoC that does not meet the necessary specification, i.e., does not operate as intended, and/or is not reliable, may result in substantial extra costs and testing time.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 3 is a table listing various functions that may be used to implement multi-level matching (MLM) functionality in the ISR for a replay mode of operation during simulation with a modified testbench according to some embodiments of the present disclosure.

FIGS. 4A, 4B, 4C, 4D, and 4E are examples of pseudocode for implementing MLM in the ISR based on the functions listed in the table of FIG. 3.

FIG. 5 is a table of key functions that may be used for an example implementation of MLM based on the pseudocode of FIGS. 4A, 4B, 4C, 4D, and 4E.

FIG. 6A is a diagram illustrating a comparison between a first testbench and a second testbench representing a modified version of the first testbench according to some examples.

FIG. 6B is a diagram illustrating a comparison between different sets of stimulus values generated with the aid of the ISR during first and second simulation runs based on variables in the respective first and second testbenches of FIG. 6A.

FIG. 6C is a diagram illustrating another comparison between different sets of stimulus values generated without using the ISR during the first and second simulation runs with the respective first and second testbenches of FIG. 6A.

FIG. 7 is a table listing examples of events and corresponding event attributes that may be recorded by the ISR while operating in a record mode during a first simulation run with the first testbench of FIG. 6A.

FIG. 8A is a table with rows illustrating a series of mapping tables in which table key values corresponding to different ordered sets of recorded events represent different levels of generalization for implementing MLM in the ISR according to some embodiments of the present disclosure.

FIG. 8B is a table illustrating a mapping between replay events and record events based on multi-level matching performed by the ISR according to some embodiments.

FIG. 9 is a table illustrating various benchmark metrics for measuring the effectiveness of using an ISR with record and replay functions for replaying a simulation with a modified testbench according to some embodiments.

DETAILED DESCRIPTION

Figure 1A:
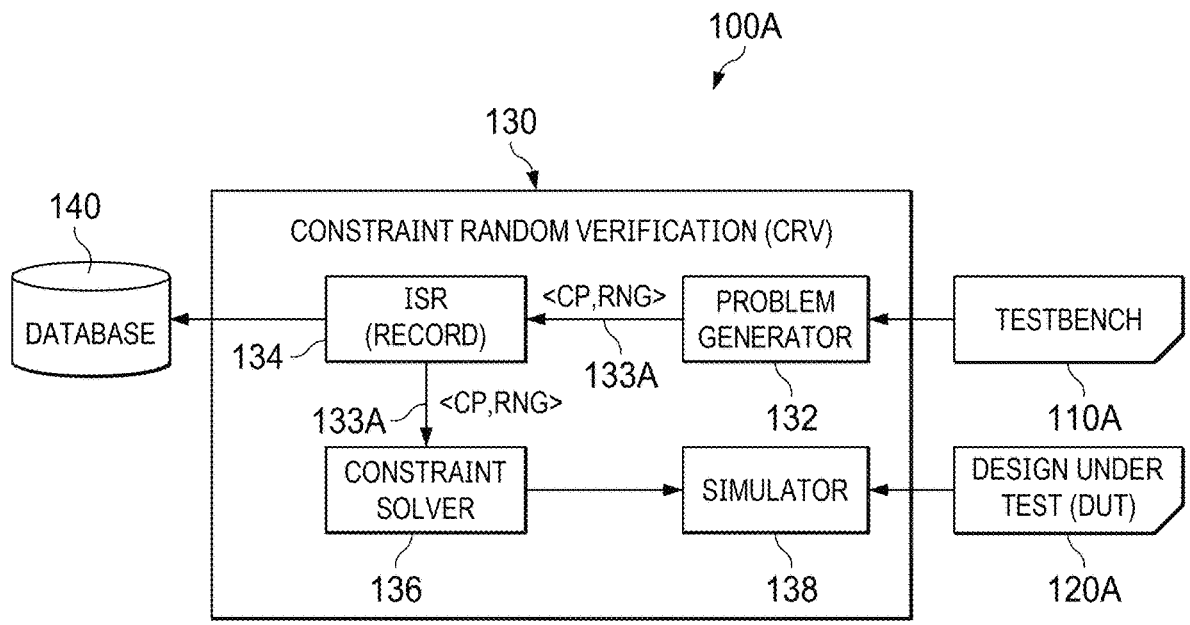
FIGS. 1A and 1B illustrate an example of a functional verification environment for simulating and verifying operation of a design under test (DUT) during different simulation runs with a constraint random testbench according to some embodiments of the present disclosure.

Aspects of the present disclosure relate to intelligent replay of a simulation based on a modified constraint random testbench. A constraint random testbench (also referred to herein as a "constrained random testbench" or "testbench") may play a key role in functional verification of a hardware design under test (DUT), such as an integrated circuit (IC) or a system-on-chip (SoC), to determine whether the DUT functions as intended under different test cases and conditions. In this functional verification, stimuli may be generated and used as inputs to the DUT to simulate operation of the DUT so that a user or an automated monitoring program may observe the functionality of the DUT that results from the stimuli. Generally, a comprehensive functional verification may include simulating operation of the DUT with different variations of the testbench and many diverse sets of stimuli generated over multiple iterations or simulation runs to cover many possible scenarios of use during a design testing and verification session. For example, one or more modifications to the testbench may be made after each simulation run to ensure that all parts of the DUT have been adequately tested during the entire session.

Simulating operation of the DUT with a constraint random testbench may expose rare events that can be observed during a given simulation run but that can be difficult to reproduce during subsequent runs after the testbench has been modified. Such rare events or observations may include, for example, design flaws, failures, bugs, and hard-to-hit simulation coverage targets. The reproducibility of these events/observations is essential for timely debugging and regression testing. However, even limiting testbench modifications to only incremental changes that are unrelated to these rare events/observations while keeping other simulation parameters does not guarantee reproducibility during subsequent simulation runs. Furthermore, regression minimizer tools, which require a specific set of tests and runtime options to re-expose the rare observations on re-simulations, become less effective when these observations cannot be reproduced due to various incremental revisions made to the testbench during the verification process. As a result, many additional simulation runs are required to expose the desired observations, thereby increasing the regression size, extending the debugging cycles, and adversely impacting productivity and time to market.

Accordingly, embodiments of the present disclosure may be used to reproduce (or "replay") events of interest or rare observations, such as bugs and hard-to-hit targets, during the simulation and functional verification of a DUT with a constraint random testbench after modifications are made to the testbench over multiple simulation runs. For example, embodiments may be used to provide an intelligent simulation re-player (ISR) within a functional verification environment or system for simulating operation of a DUT with a constraint random testbench. Such a verification environment may be implemented as part of a computer system for hardware design, verification, and debugging, as will be described in further detail below with reference to FIGS. 1A, 1B, and 12. The ISR of the system in this example may be used to intelligently replay the results of a previous simulation run after making one or more modifications to the constraint random testbench for a current simulation run while keeping other simulation parameters, such as runtime/build options and build tool versions identical. A random number generator may be used to generate random values for a series of constraint problems to be solved by a constraint solver of the verification system during each simulation run. Each constraint problem may represent, for example, one or more constraints on a random variable that may affect the simulation. The constraint solver may use each random value to solve a corresponding constraint problem in the series and generate a set of stimuli that is input into the DUT during the simulation run.

As will be described in more detail below, the intelligent replay feature of the ISR in the above example allows stimulus values generated during the current simulation run to match those generated during the previous run, thereby enabling any rare events/observations (e.g., bugs, hard-to-hit targets, etc.) produced during the previous run to be reproduced during the current run. Thus, if constraints on an existing random variable are not altered by the testbench changes made after the previous run, then the replay feature of the ISR allows matching stimulus values to be generated and used to simulate operation of the DUT during the current run with the modified testbench. It should be appreciated that there may be some acceptable amount of deviation between the previous and current sets of stimulus values that is necessitated by the testbench changes between these simulation runs.

According to some examples described herein, the ISR in conjunction with a constraint solver of the verification system may be used to solve a matching problem online at runtime, where each constraint problem (CP) that is generated during a current simulation run gets matched to a previously generated constraint problem (denoted CP') from the original or previous simulation run. Once matched, an initial (or "pre-solution") state of each CP prior to being solved by the constraint solver may be set to that of its matching CP' to thereby enable the constraint solver to produce the original or previous outcome associated with that CP'. The pre-solution state of each CP may correspond to a seed state of the random number generator (RNG) associated with that CP. The RNG seed state for a CP may represent, for example, a state of the random number generator prior to the constraint solver solving the CP during the original or previous simulation run.

In some examples, the ISR of the verification system may operate in a recording mode to record information representing an instance of each CP', including the RNG seed state (RNG') and other key attributes of that CP', generated during a first simulation run with a first testbench. For example, the information for each instance of a CP' and its corresponding attributes may be stored as a recorded event (or "record event") in a non-volatile memory or database associated with the verification system. The ISR may later switch to a replay mode of operation during a second simulation run performed after one or more modifications are made to the first or original testbench used in the first run. In replay mode, a multi-level matching (MLM) unit of the ISR may be used to locate a recorded instance of a matching CP' (or record event) in the database for each instance of a newly generated CP (or "replay event") during the second simulation run. The information associated with the matching CP' may then be retrieved from the database and used to update at least one attribute (e.g., the RNG seed state) of the new CP to match the corresponding attribute(s) (e.g., RNG') of the matching CP'. The updated CP may then be provided to the constraint solver for solving the CP during the second simulation run with the modified testbench. This allows the original simulation run (or relevant portion thereof), including the record event with the matching CP', to be replayed such that any rare observations or events of interest that were produced with the original testbench may be reproduced during the subsequent simulation run with the modified testbench.

Technical advantages of the present disclosure include, but are not limited to, an efficient, automated computer system with simulation replay functionality that obviates the need for additional simulation runs or specialized regression minimizer tools to reproduce events of interest observed during simulation after modifications are made to the original testbench. Reducing the number of simulation runs may reduce the amount of computing resources required for functional verification and testing of a hardware design. This not only improves verification efficiency, but also allows more computing resources to be available for other tasks during the design process. As the functionality of the present computer system may be enabled using only runtime switches without requiring any changes to existing build tool or compiler settings, it can be seamlessly integrated into an existing verification workflow. Moreover, by enabling the present computer system to provide the simulation replay functionality without placing any restrictions on how the testbench is modified during simulation, such functionality may be provided for a broad range of testbench modifications while ensuring that all constraints are honored by stimulus values generated for the replayed simulation. Furthermore, unlike conventional solutions that match stimulus values for reproducing a failure or other event of interest post-simulation, the present computer system uses multi-level matching (MLM) to match stimulus values during the simulation at runtime. Also, unlike the conventional solutions for stimulus matching, which have quadratic runtime and spatial complexity, the complexity of the MLM used in the present computer system in terms of both runtime and space is linear. These and other benefits and advantages may be achieved by various examples described herein.

Figure 1B:
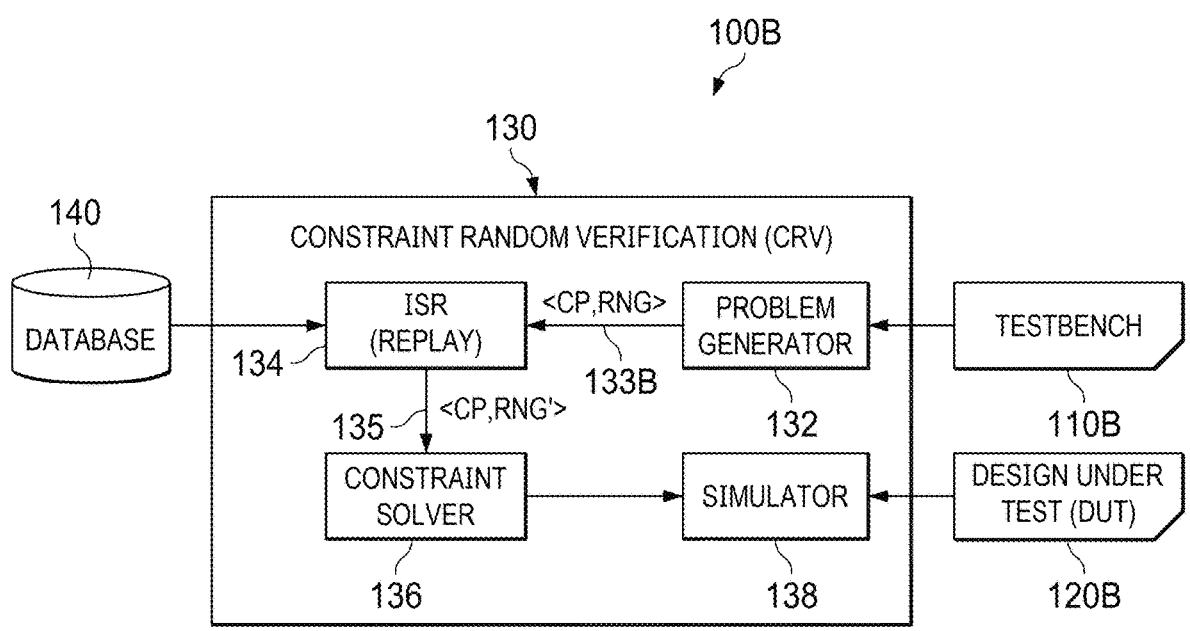

FIGS. 1A and 1B illustrate an example of a functional verification environment for simulating and verifying operation of a design under test (DUT) during different iterations or simulation runs with a constraint random testbench according to some embodiments of the present disclosure. For example, FIG. 1A illustrates a functional verification environment 100A during a first simulation run for simulating and verifying operation of a DUT 120A with a first testbench 110A. FIG. 1B illustrates a functional verification environment 100B that corresponds to the environment 100A of FIG. 1A during a second simulation run for simulating and verifying operation of a DUT 120B with a second testbench 110B. The second testbench 110B in this example may represent a modified version of the first testbench 110A based on one or more changes made to the first testbench 110A after the first simulation run. Likewise, the DUT 120B may represent a modified version of the DUT 120A based on, for example, one or more changes to the state of the DUT 120A after the first simulation run. As will be described in further detail below, any of various changes may be made to the first testbench 110A, where each change may be classified according to the severity of the change. The change severity and classifications may range from trivial changes (e.g., changes affecting the order or name of a single class or variable) to more complex and extensive changes (e.g., changes affecting a combination of different classes and variables). The functional verification environment in this example, including the respective environments 100A and 100B of FIGS. 1A and 1B, may be implemented in a computer system having at least one processor and a memory. An example of such a computer system will be described in further detail below with reference to FIG. 12.

As shown in FIGS. 1A and 1B, the functional verification environments 100A and 100B include a constraint random verification (CRV) tool 130. The CRV tool 130 includes a problem generator 132, an intelligent simulation re-player (ISR) 134, a constraint solver 136, and a simulator 138. Although not shown in FIGS. 1A and 1B, the CRV tool 130 may include any number of additional components and subcomponents as desired for a particular implementation. In some implementations, the CRV tool 130 and components thereof may be embodied as instructions stored on a non-transitory computer-readable medium, where the instructions are executable by one or more processors of the computer system. In other implementations, components of the CRV tool 130 (or corresponding instructions therefor) may be spread across multiple computer systems for execution by corresponding processors in a distributed computing environment.

During the first simulation run, the simulator 138 of the CRV tool 130 in the functional verification environment 100A of FIG. 1A may be used to simulate operation of the DUT 120A with the testbench 110A. The DUT 120A may be a hardware design, such as an IC or SoC design that is being tested and verified with the objective of manufacturing the hardware represented by the design. The DUT 120A may be represented by, for example, a DUT file, which includes an electronic (e.g., digital) representation of the hardware design in question. The DUT file may include a description of the hardware design, such as a hardware description language (HDL) description (e.g., written in Verilog or other HDL), a register transfer level (RTL) description, a gate-level description, a layout-level description, or the like. The DUT file representing the DUT 120A in this example may be stored and retrieved from a memory of the computer system before being provided as input to the simulator 138. The simulator 138 may simulate operation of the DUT 120A using stimulus values that are output by the constraint solver 136 based on constraints specified by the testbench 110A, as will be described in further detail below.

The testbench 110A may be represented by, for example, a constraints file that may be stored and retrieved from the memory of the computer system before being provided as input to the problem generator 132 at the start of the first simulation run. In some implementations, the testbench 110A (or constraints file) may include code written in an object-oriented hardware description and verification language, such as SystemVerilog. The testbench 110A may include, for example, declaratory statements of constraints for various signals from which stimulus values are to be generated for simulation. The testbench 110A in this example may define integer quantities representing the signals, either in a class definition or as stand-alone variables, which can be assigned random values based on a set of constraints. Class definitions within the testbench 110A may include, for example, "rand" modifiers that indicate which variables are to undergo randomization for purposes of creating randomized scenarios for verification. Any constraint included in a class definition may restrict an upper bound and/or lower bound of a given signal, require a logical relation between multiple signals, etc. The constraints may also include dynamic constraints based on a state of the DUT 120A during simulation by the simulator 138. The problem generator 132 may also observe the state of the DUT 120A during simulation and dynamically unfold constraints accordingly.

The problem generator 132 translates the constraints, based on the testbench 110A and/or state of the DUT 120A during the first simulation run as described above, to generate a series of constraint problems to be solved by the constraint solver 136. Each constraint problem in the series may be generated by the problem generator 132 with a corresponding random value to be used by the constraint solver 136 as a seed value when solving the constraint problem. Although not shown in FIGS. 1A and 1B, the problem generator 132 in some implementations may include a random number generator that produces a randomly generated seed value for each constraint problem to be solved by the constraint solver 136.

As shown in FIG. 1A, the problem generator 132 during the first simulation run may generate an output 133A that includes a series of constraint problem instances <CP, RNG>, where "CP" represents each constraint problem generated in the series along with various attributes representing a signature of the CP, and "RNG" represents a corresponding seed value generated by the random number generator (RNG) for that CP. The RNG or seed value associated with each CP may also represent a corresponding seed state (or pre-solution state) of the random number generator for that CP. Each CP or CP instance in the output 133A generated by the problem generator 132 may be in the form of a constraint expression tree. The attributes of the constraint expression tree or CP may include a structure of the tree, an order of the variable randomization defined for the CP, a randomization serial number, and a randomization call site (e.g., a file name, line number, and/or class name as defined in the testbench 110A) for the CP.

During the first simulation run, the ISR 134 may operate in a record mode to record the output 133A (including each CP instance) generated by the problem generator 132 before it is provided to the constraint solver 136, as shown in FIG. 1A. In some implementations, the ISR 134 may store information representing each CP instance in the series and corresponding CP attributes as an event within a database (DB) 140. For example, the following pseudocode may be used to define a record function of the ISR 134 for recording or saving each instance of a constraint problem to be solved by the constraint solver 136 as a tuple representing an event with corresponding event attributes and RNG seed value during the first simulation run:

```
def isr_record(cp, RNG):
    //obtain the event attributes and save the event in order
    CP = <varSig(CP), probSig(CP), serial(CP), callSite(CP)>
    save_event(<CP, RNG>),
``` where: "varSig" (variable signature) may be an integer value representing an ordered sequence of variables as they appeared in the constraint expression tree of the constraint problem CP; "probSig" (problem signature) may be a string value representing the structure of the constraint expression tree for the CP; "serial" may be an integer value representing a randomization serial number corresponding to an order of the randomization call effecting the generation of the CP instance or event in the series of events being recorded/saved during the simulation run; "callSite" may be a string value representing the call site of randomization, such as file name, line, and class name; and "RNG" may be an integer value representing the random generator seed state of the CP. Although listed separately from the event attributes in the pseudocode example above, the RNG seed state may be considered another attribute of the constraint problem or event recorded by the ISR 134. The DB 140 used to store the recorded events may be any non-volatile memory or data store integrated with or communicatively coupled to the computer system used to implement the functional verification environment 100A and 100B of FIGS. 1A and 1B.

The constraint solver 136 may receive the output 133A (including the constraint problems and corresponding RNG seed values generated by the problem generator 132) from the ISR 134 or directly from the problem generator 132. The constraint solver 136 may solve one or multiple constraint problems during each simulation run to generate stimulus values for the simulator 138. During the first simulation run, for example, the constraint solver 136 may use the received constraint problems and random values included in the output 133A of the problem generator 132 to produce stimulus values of signals that are within the constraints defined by the testbench 110A. The constraint solver 136 in this example may use the random values to solve the constraint problems that it receives based on commands in the testbench 110A. The simulator 138 may apply the stimulus values produced by the constraint solver 136 as inputs to the DUT 120A to simulate operation of the DUT 120A and test particular areas or features thereof. The results of the simulation, e.g., as stored in a trace captured during the simulation, may then be analyzed to determine coverage and identify areas that require additional testing.

The testbench 110A may be modified after the first simulation run (e.g., to refine constraints or add new test scenarios), and the simulation may be repeated over additional simulation runs as needed to improve coverage and uncover more bugs. As described above, the modifications to the testbench 110A may include any of various changes that may be classified according to the severity or complexity of each change. For example, testbench changes may be classified according to the following categories of change severity: trivial (e.g., the addition of comments or changes in filename, class name, line number, class arrangement, etc.); easy (e.g., reordering of variables, constraints, or functions); medium (e.g., adding, removing or otherwise modifying a class, variable, constraint, or order of randomization); hard (e.g., adding or removing randomization, changing a repeat count of randomization, or adding a new randomization or "randomize( )" command for an existing object); and complex (e.g., any combination of changes from two or more of the foregoing categories).

However, regardless of the type or severity of the changes made, some rare observations or events of interest may be difficult to reproduce during subsequent simulations runs after the original testbench has been modified. This is due in part to the randomized and nondeterministic way in which stimulus values for the simulator 138 are generated by the constraint solver 136 based on constraints defined in the testbench. Also, due to the large amount of trace data that may be captured during a simulation, conventional solutions may require an extensive post-simulation analysis to identify a particular instance of the constraint problem that led to a rare event or observation.

To obviate the need for such post-simulation analysis to identify relevant constraint problem instances or further simulation runs to reproduce a rare event or observation of interest, the ISR 134, as shown in the functional verification environment 100B of FIG. 1B, may be placed into a replay mode of operation to intelligently replay a relevant portion of the first simulation run to reproduce an event or observation of interest during a second simulation run with a modified testbench (the testbench 110B) at runtime. As described above, the testbench 110B in the example of FIG. 1B may represent a modified version of the testbench 110A of FIG. 1A (or corresponding constraints file) based on one or more testbench changes of varying degree and severity made after the first simulation run. Such testbench changes may include, for example, manual changes made to the testbench 110A by a user or automated changes made according to automated design processes implemented in the functional verification environment 100A, e.g., to automatically refine constraints to achieve better coverage and/or correct any discrepancies based on a comparison between recorded observations and expected outputs during the first simulation run.

Aside from the ISR 134, the other components of the CRV tool 130 may perform similar operations during the second simulation run as those performed during the first simulation run. For example, the problem generator 132 may use the testbench 110B to generate an output 133B including a new series of constraint problems with corresponding RNG seed values for the constraint solver 136 to produce stimulus values for the simulator 138 to simulate operation of the DUT 120B. Like the testbench 110A and DUT 120A described above, the testbench 110B and the DUT 120B in this example may be represented by a constraints file and a DUT file, which are stored and retrieved from the memory of the computer system before being provided as input to the problem generator 132 and the simulator 138, respectively, during the second simulation run. In some implementations, the retrieved files may be modified versions of the original constraints file and DUT file that corresponded to the testbench 110A and DUT 120A during the first simulation run. However, for purposes of replaying the previous simulation run with the modified testbench 110B, the ISR 134 operating in replay mode may invoke a multi-level matching (MLM) utility or program to match each new CP with a suitable matching constraint problem (CP') or CP' instance that was previously recorded as an event in the DB 140 during the first simulation run as described above. In some implementations, the ISR 134 may include a dedicated module or sub-component (not shown) for providing the MLM functionality described herein.

Once a match is found for a new CP instance <CP, RNG> produced by the problem generator 132 during the second simulation run, the ISR 134 (or MLM module thereof) may retrieve the recorded event <CP', RNG'> (including the corresponding event attributes) from the DB 140. The ISR 134 may then use the recorded event retrieved from the DB 140 to set or update at least one attribute (e.g., the RNG seed state) of the current CP to match a corresponding attribute (e.g., RNG') of the matching CP'. For example, the ISR 134 may produce an updated output 135 in which the CP instance <CP, RNG> from the output 133B generated by the problem generator 132 becomes <CP, RNG'>, as shown in FIG. 1B.

The updated output 135, including the CP instance with the RNG seed state set to the previous RNG' seed state (or pre-solution state of the suitable matching CP' from the first simulation run), may then be provided to the constraint solver 136. This enables the constraint solver 136 to produce stimulus values that match those produced during the first simulation run with the testbench 110A. Moreover, these stimulus values may be used by the simulator 138 during the second simulation run to reproduce a previous event of interest or outcome observed during the first simulation run (and thus, replay a relevant portion thereof) even after changes are made to the first testbench 110A. Aside from modifications to the testbench 110A in this example, other factors that can affect the simulation, such as runtime or build options and build tool versions, may be kept the same between multiple simulation runs to maintain reproducibility and limit any additional verification and debugging efforts that may be required as a result of modifying any such factors.

Although illustrated in FIGS. 1A and 1B as separate components of the CRV tool 130, the problem generator 132, ISR 134, and constraint solver 136 in some implementations may be combined as part of a constraint random stimulus generator of the CRV tool 130. Such a constraint random stimulus generator may be used by the CRV tool 130 to perform the same or similar functions as the problem generator 132, ISR 134, and constraint solver 136. For example, the constraint random stimulus generator may perform such functions to generate constrained random stimulus values for the simulator 138 to simulate operation of the DUT 120A and DUT 120B during the first and second simulation runs with the first and second testbenches 110A and 110B of FIGS. 1A and 1B, respectively, as described above.

Figure 2:
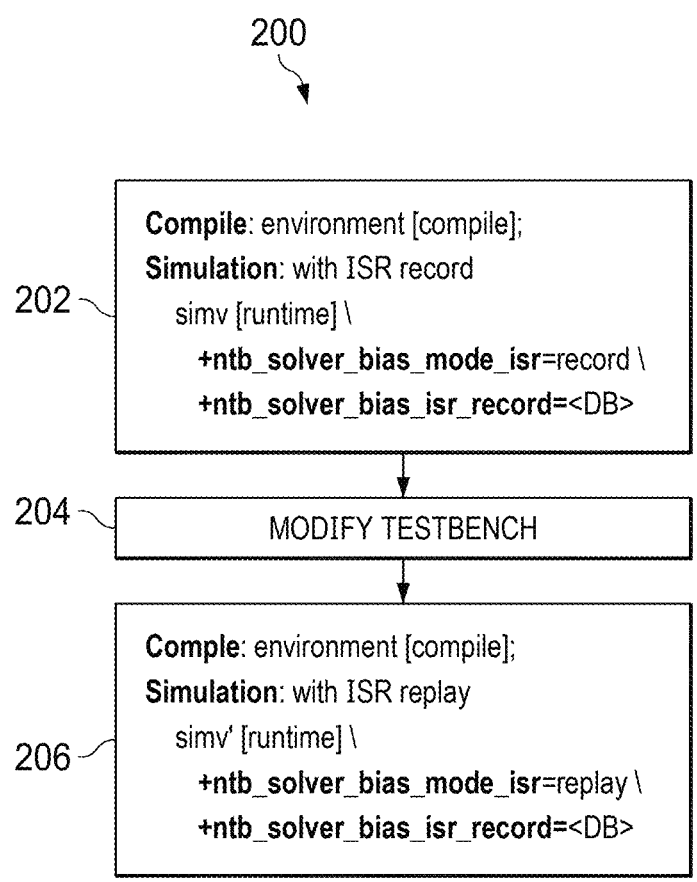
FIG. 2 illustrates pseudocode of a use model for implementing an intelligent simulation re-player (ISR) in a functional verification environment according to some embodiments of the present disclosure.

FIG. 2 illustrates pseudocode of a use model 200 for implementing an ISR (e.g., the ISR 134 of FIGS. 1A and 1B, as described above) in a functional verification environment according to some embodiments of the present disclosure. The use model 200 may enable the ISR to reproduce observed events of interest during subsequent simulation runs performed after modifications are made to an initial version of a testbench (e.g., the testbench 110A of FIG. 1A, as described above). As shown in FIG. 2, the use model 200 includes different segments of pseudocode (at 202 and 206) for compiling and executing a binary file with runtime switches or options to selectively enable different operating modes of the ISR during different stages of simulation (e.g., first and second simulation runs) performed before and after the testbench is modified (at 204). Each simulation run may involve simulating the operation of a DUT (e.g., the DUT 120A and 120B of FIGS. 1A and 1B, respectively, as described above) based on constraints defined in the testbench.

At 202, the pseudocode of the use model 200 begins with a compile statement for compiling the environment, including source files, to generate an executable binary file (simv) for simulating operation of the DUT during the first simulation run with the testbench. The pseudocode at 202 following compilation adds a first runtime option ("+ntb_solver_bias_mode_isr=record") to the binary file to enable the ISR to operate in a recording mode for recording constraint problems generated during the first simulation run (e.g., by the problem generator 132 of FIG. 1A, as described above). As described above, the constraint problems may be recorded as events, where information representing each constraint problem (CP) or recorded event includes the corresponding CP or event attributes. The pseudocode at 202 also adds a second runtime option ("+ntb_solver_bias_isr_record=<DB>") to the binary file to indicate a storage location ("<DB>") for the events and corresponding information recorded by the ISR during the first simulation run. The storage location may be, for example, a database (e.g., DB 140 of FIGS. 1A and 1B, as described above) or other non-volatile memory location accessible to the ISR in the functional verification environment.

At 204, the testbench used to simulate operation of the DUT during the first simulation run is modified. As described above, any of various modifications with varying degrees of change severity may be made to the testbench. Also, as described above, such testbench modifications may include manual changes made by a user or automated changes made by automated design processes implemented in the functional verification environment or constraint random verification (CRV) tool thereof (e.g., the CRV tool 130 of FIGS. 1A and 1B, as described above).

After the testbench is modified, the pseudocode at 206 may be used to recompile the environment and generate a new executable binary file (simv') for the second simulation run. The pseudocode at 206 may also be used to add appropriate runtime options to the new binary file to enable the ISR to operate in a replay mode for reproducing the previously recorded events during the second simulation run with the modified testbench. For example, a first runtime option ("+ntb_solver_bias_mode_isr=replay") for enabling the replay mode of the ISR may be added to the binary file (simv') while keeping the second runtime option ("+ntb_solver_bias_isr_record=<DB>") that was previously used at 202 to indicate the storage location of recorded events unchanged.

As will be described in further detail below, the ISR operating in replay mode may use a multi-level matching (MLM) technique to suitably match each current event (or constraint problem) generated during the second simulation run (based on the modified testbench) with a previously recorded event from the first simulation run. As described above, at least one attribute of each current event may be updated during the second simulation run based on the corresponding attributes of the matching event recorded during the first simulation run, e.g., by setting the RNG seed state of each current event to the corresponding RNG seed state of the matching event that was previously recorded.

FIG. 3 is a table 300 listing various functions that may be used to implement MLM functionality in the ISR for a replay mode of operation during simulation (e.g., the second simulation run described above) with a modified testbench according to some embodiments of the present disclosure. The ISR in replay mode may use MLM to determine or locate a suitable matching event from a set of previously recorded events for each new or current event based on the corresponding event attributes. To enable the ISR to search for a matching event from the recorded events stored in a database (e.g., DB 140 of FIGS. 1A and 1B) using MLM, one or more mapping tables may be generated with varying levels of generalization and restrictions on the requirement of matching. Each table may be associated with a table key, which may be a key function (e.g., "k_i" or "K_i") of one or more event attributes depending on the table's level of generalization/restriction. Each table having an assigned index (i) maps a key (k_i(e)) computed for an event (e) to a set of events by matching their key values, ordered by their serial numbers.

For each event e (where e may represent a CP instance <CP,RNG>), starting from the most restrictive (or least generalized) to the least restrictive (or most generalized), the key k_i(e) may be computed and used to perform a lookup in each table i. If the key is found, a suitable matching event e' (representing a previously recorded CP instance <CP', RNG'>) may be determined or located from the mapped set of events based on a ranking of a serial number associated with each potential matching event or candidate for a current event and various context-aware criteria. Such criteria may include, for example and without limitation: (1) if a potential candidate is mapped exclusively/sharable/none previously; (2) if the serial number of the potential candidate matches that of the latest matching event; (3) if the serial number of the current event matches that of the last event; and (4) if the potential candidate is the next repeat instance of a previously matched recorded instance.

Unlike some conventional solutions that perform stimulus matching post-simulation and that have quadratic runtime and spatial complexity, the MLM techniques used by the ISR may be used to match stimulus values during the simulation at runtime with a linear runtime complexity of O(n) and a linear spatial complexity of O(m), where m represents the number of recorded events in a first simulation run and n represents the number of replayed events in a second simulation run.

FIGS. 4A, 4B, 4C, 4D, and 4E are examples of pseudocode for implementing MLM in the ISR (or an MLM module thereof) based on the functions listed in the table 300 of FIG. 3 described above. The pseudocode in FIG. 4A may be used, for example, to first initialize MLM by invoking an "initialize" function, as defined by the pseudocode in FIG. 4B, before using MLM for matching replay events to recorded events by invoking an "isr_restore" function, as defined by the pseudocode in FIG. 4C. The pseudocode for the isr_restore function in FIG. 4C may invoke a "find_matching_event" function, as defined by the pseudocode in FIG. 4D, which may in turn invoke a "find_matching_event_first_time" function, as defined by the pseudocode in FIG. 4E. The functions corresponding to the pseudocode in FIGS. 4A, 4B, 4C, 4D, and 4E may operate together to implement MLM in the ISR.

The operation of MLM in the ISR based on these functions may involve initially generating mapping tables may be with varying degrees or levels of generalization (or restriction) on the requirements for matching the attributes of each replay event during a second simulation run with those of a recorded event from a first simulation run. The recorded event and event attributes may represent an instance of a constraint problem (CP) solved by a constraint solver during the first simulation run along with its corresponding CP attributes (including a pre-solution state of the CP prior to being solved). Each mapping table may be based on a corresponding table key that functions as a unique generalization of a representation of each recorded CP or CP instance. A key-value pair may be inserted into each table for each recorded CP instance, where the key is computed based on the representation of the recorded CP instance and the value corresponds to a set of recorded CP instances having the same key.

For each replay event corresponding to a new CP or CP instance to be solved during the second simulation run, a mapping table that has the least generalization of the representation of the constraint problem may be identified from among the mapping tables that were initially generated. A corresponding key-value pair of the identified mapping table may be retrieved and a recorded representation of a CP instance from the value set of CP instances mapped to the table key may be selected as a matching CP for the new CP instance to be solved during the second simulation run.

FIG. 5 is a table 500 of key functions that may be used for an example implementation of MLM based on the pseudocode of FIGS. 4A, 4B, 4C, 4D, and 4E. Although the table 500 lists a total of sixteen key functions for the MLM implementation in this example, it should be appreciated that embodiments are not intended to be limited thereto and that any number of key functions may be used. As shown in FIG. 5, each key function listed in the table 500 may represent a different event (e) as a tuple with values corresponding to different event attributes (e.g., file, line, class, probSig, and varSig). The event represented by each key function may be a potential matching event for a current event. Each key function may be used to evaluate how well a potential candidate event matches a current event, where a key metric may be assigned to each key function based on the number of event attributes that match those of the current event.

For example, the event attributes for a current event to be matched may have the following values: file=foo.sv; line=10; class=myclass; probSig="a string of 16 characters"; and varSig=32-bit_val. The key functions K_3, K_7 and K_15 in this example may be used to evaluate three candidate events as follows:

$$K\_3(e) = \langle foo.sv, *, myclass, \text{"a string of 16 characters"}, 32\text{-bit\_val} \rangle$$

$$K\_7(e) = \langle foo.sv, *, myclass, *, 32\text{-bit\_val} \rangle$$

$$K\_15(e) = \langle foo.sv, *, myclass, *, * \rangle,$$

where "*" represents a potential mismatch between the candidate and current event with respect to a particular event attribute, and the key metrics for each key function and candidate are 4, 3, and 2, respectively. It should be appreciated that embodiments of the present disclosure are not limited to the number or type of event attributes provided in this example and that events may have any number of attributes of various types, as desired for a particular implementation.

FIG. 6A illustrates a comparison between an original or first testbench 610 and a second testbench 620 representing a modified version of the first testbench 610 according to some examples. Each of the testbenches 610 and 620 in this example may be implemented as a source file including multiple lines of code written in SystemVerilog or other object-oriented hardware description and verification language, as described above. The testbench 620 may be based on various modifications made to the code at different lines or sections of the testbench 610. As shown in FIG. 6A, the modifications made to the testbench 610 to produce the testbench 620 may include, for example and without limitation:

adding a new random variable "d" in "class tb1" at a section 612 of the first testbench 610, which corresponds to a section 622 of the testbench 620;

adding a "with constraint" on random variable "c" in "class tb2" at line 624; and re-ordering the randomization of instances of "class tb1" and "class tb2" at different sections 616 of the testbench 610, which correspond to sections within an area 626 of the testbench 620.

The constraints on different variables specified in the testbenches 610 and 620 may be used to generate stimulus values for simulating operation of a DUT during first and second simulation runs, respectively. For example, FIG. 6B illustrates a comparison between different sets of stimulus values 615B and 625B generated during the first and second simulation runs based on the variables in the testbenches 610 and 620 of FIG. 6A, respectively. By configuring the ISR to operate in a replay mode while keeping other build and runtime options unchanged, stimulus values matching those in the first simulation run may be generated during the second simulation run even after modifications are made to the original testbench 610. With the aid of the ISR, matching stimulus values in the set 625B may be generated during the second simulation run based on variables (e.g., "t1.a", "t1.b", and "t2.d") in the modified testbench 620 that were unaffected by the modifications made to the original testbench 610, as shown in FIG. 6B.

By contrast, FIG. 6C illustrates a comparison between different sets of stimulus values 615C and 625C generated during the respective first and second simulation runs without the aid of the ISR. As shown in FIG. 6C, none of the stimulus values in the set 625C generated during the second simulation run with the modified testbench 620 match those in the set 615C generated during the first simulation run regardless of which variables were affected by the modifications made to the original testbench 610. Even with the ISR, however, any variables (e.g., "t1.d" and "t2.c") in the modified testbench 620 that were affected by the modifications are not expected to produce matching stimulus values.

The ISR used in the above example of FIG. 6B to produce matching stimulus values during the second simulation run with the modified testbench 620 may be initially configured to operate in a recording mode to record events during the first simulation run with the original testbench 610. FIG. 7 is a table 700 listing examples of events and corresponding event attributes that may be recorded by the ISR while operating in a record mode during simulation with the testbench 610. Although a total of twelve events are listed in table 700, it should be appreciated that any number of events may be recorded. In addition to the event attributes, the information recorded for each event may include an event number and a randomization serial number, which may be assigned based on an order of the corresponding randomization call during the simulation run. As described above, each recorded event may represent an instance of a constraint problem generated from the variables and constraints defined in the original testbench 610. The attributes associated with each event in this example may include a file attribute (e.g., "test.sv" or name of the source file used to implement the testbench 610), line attribute (e.g., appropriate line number within the testbench file), class, probSig, and varSig. As described above, the probSig and varSig attributes of each event may be values representing signatures of the constraint problem structure and order of variables in the constraint problem instance corresponding to the event. Although not shown in table 700, additional event attributes (e.g., the RNG seed state) for each event may also be recorded by the ISR.

After the first simulation run, the ISR may be reconfigured to operate in a replay mode during the second simulation run with the modified testbench 620 as described above. In replay mode, the ISR may use multi-level matching (MLM) to match each replay event (e) observed during the second simulation run to a recorded or record event (re). FIG. 8A is a table 800A with rows illustrating a series of mapping tables in which table key values corresponding to different ordered sets of recorded events represent different levels of generalization for implementing MLM in the ISR according to some embodiments of the present disclosure. As shown in FIG. 8A, the ISR using MLM may first initialize 16 mapping tables that are populated with recorded events (e.g., using the "initialize" function of FIG. 4B, as described above). The "Value" column of each table corresponds to an ordered set of recorded events with the same key as in the "Key" column. For ease of discussion and illustration, only mapping tables 1, 3, 7, and 15 corresponding to key function K_1, K_3, K_7, and K_15, respectively, are shown in FIG. 8A.

FIG. 8B is a table 800 illustrating a mapping between replay events and record events based on the matching performed by the ISR using MLM according to some embodiments. The table 800 in this example includes a "key used" column that indicates which key function with the largest key_metric matches each replay event to a corresponding record event. For example, replay event #1 in table 800 is mapped to record event #7 using key k_3 having a key_metric of 4, while replay event #7 is matched to record event #0 using key k_15 having a key_metric of 2. The value of the key_metric used to map each replay event with a matching record event may serve as a confidence score representing the degree of confidence in the matching performed by the ISR or relative strength of the match determined for the replay event in the mapping.

FIG. 9 is a table 900 that illustrates various benchmark metrics for measuring the effectiveness of using an ISR with record and replay functions for replaying a simulation (or relevant portion thereof) with a modified testbench according to some embodiments. To obtain the metrics in table 900, a constraint debug runtime option (e.g., "+ntb_solver_diff=trace") may be used to generate a full stimulus trace dump during the simulation. A trace diff utility that takes two trace dumps and a mapping file (generated by the ISR with a list of tuples <x, y>) may be used to compare the stimulus values generated in an $x^{th}$ randomization during a re-simulation (or second simulation run) of a replay event ("e") with that generated in a $y^{th}$ randomization during the original simulation (or first simulation run) of the mapped record event ("re"). The metrics in table 900 indicate that the observed overhead (or performance penalty) when using the ISR was less than 6% and that the number of unexpected stimulus mismatches in these instances was zero. Such metrics highlight the efficacy of using the ISR for re-simulation or simulation replay after modifications are made to the original testbench.

Figure 10:
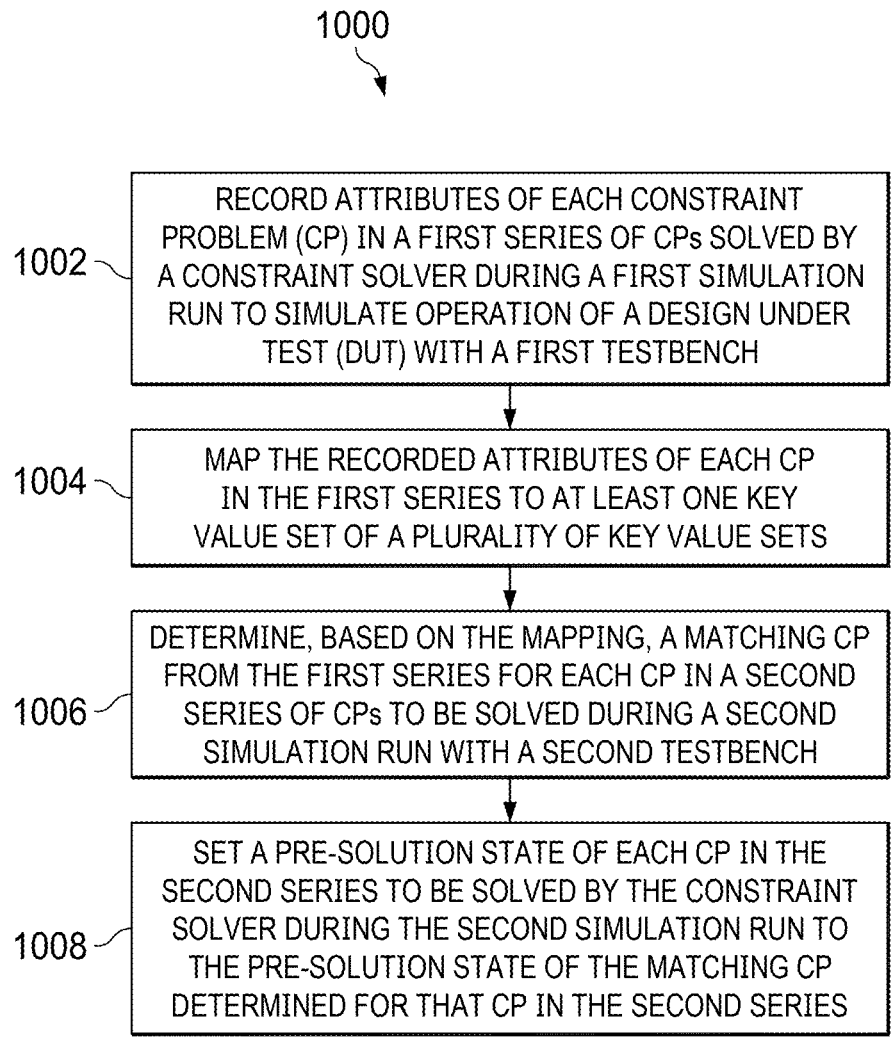
FIG. 10 is a flowchart illustrating a process for replaying a simulation with a modified constraint random testbench according to some embodiments.

FIG. 10 is a flowchart illustrating a process 1000 for replaying a simulation, or simulated operation of a DUT (e.g., DUT 120A and 120B of FIGS. 1A and 1B, respectively, as described above), with a modified constraint random testbench according to some embodiments. For purposes of discussion, the process 1000 will be described using the functional verification environment of FIGS. 1A and 1B, as described above, but process 1000 is not intended to be limited thereto. The process 1000 may be implemented using, for example, the ISR 134 in the functional verification environment of FIGS. 1A and 1B, as described above.

At 1002, attributes of each constraint problem (CP) in a first series of constraint problems (CPs) solved by a constraint solver (e.g., the constraint solver 136 of FIG. 1A) during a first simulation run is recorded. The CPs may be generated to simulate operation of the DUT with a first testbench (e.g., the testbench 110A of FIG. 1A). The attributes recorded for each CP in the first series may include, but are not limited to, the class name, randomization call site, serial number, probSig, varSig, and a RNG seed state, as described above. The RNG seed state may correspond to a pre-solution state of the CP before it is solved by the constraint solver The attribute information for each CP may be in the form of a tuple, which may be stored as an event within a database (e.g., DB 140 of FIGS. 1A and 1B) or other non-volatile memory, such as a hard disk drive, accessible to the functional verification environment.

At 1004, the recorded attributes of each CP in the first series are mapped to at least one key value set of a plurality of key value sets, where each key value set of the plurality of key value sets uses a different level of generalization to represent the recorded attributes of each CP mapped to that key value set.

At 1006, a matching CP from the first series for each CP in a second series of CPs to be solved by the constraint solver during a second simulation run is determined based on the mapping at 1004. The matching CP determined for each CP in the second series is mapped to a key value set of the plurality of key value sets that uses a least level of generalization to represent the recorded attributes of the matching CP. The second series of CPs may be generated during the second simulation run to simulate operation of the DUT with a second testbench (e.g., the testbench 110B of FIG. 1B). The second testbench may be, for example, a modified version of the first testbench. For example, one or more modifications may be made to the first testbench by a user or an automated process implemented in the functional verification environment or associated CRV tool (e.g., the CRV tool 130 of FIGS. 1A and 1B), as described above.

At 1008, a pre-solution state (e.g., the RNG seed state) of each CP in the second series to be solved by the constraint solver during the second simulation run is set to the pre-solution state of the matching CP determined for that CP in the second series.

Figure 11:
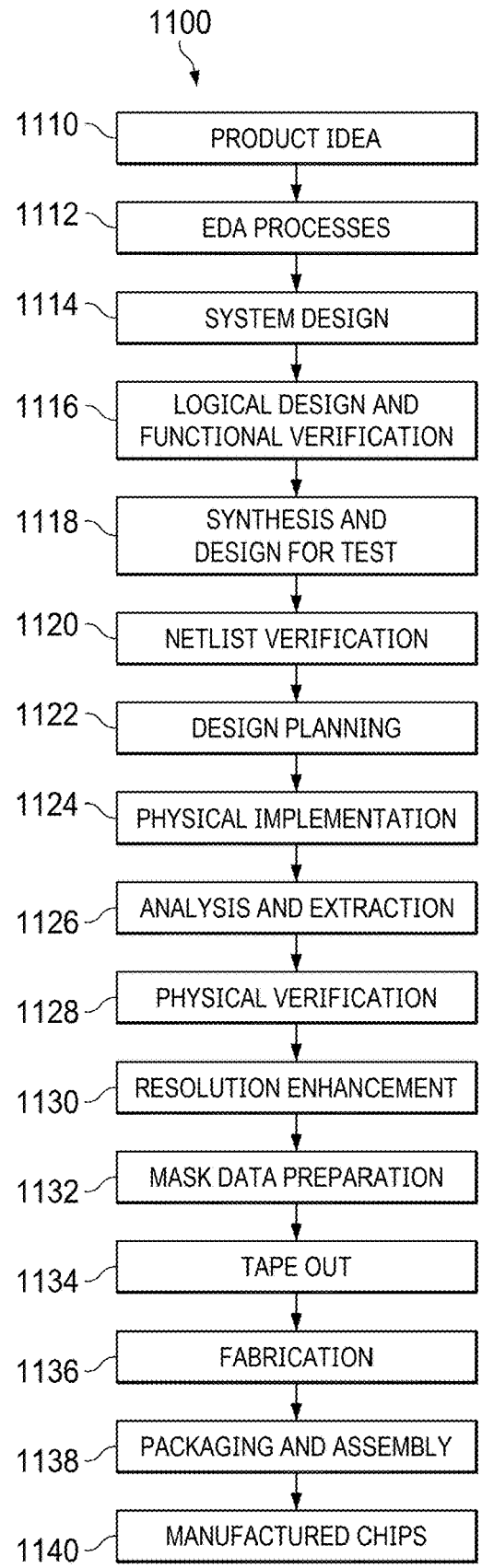
FIG. 11 is a flowchart of various processes used during the design and manufacture of an integrated circuit in accordance with some embodiments.

FIG. 11 illustrates an example set of processes 1100 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 1110 with information supplied by a designer, information which is transformed to create an article of manufacture that uses a set of EDA processes 1112. When the design is finalized, the design is taped-out 1134, which is when artwork (e.g., geometric patterns) for the integrated circuit is sent to a fabrication facility to manufacture the mask set, which is then used to manufacture the integrated circuit. After tape-out, a semiconductor die is fabricated 1136 and packaging and assembly processes 1138 are performed to produce the finished integrated circuit 1140.

Specifications for a circuit or electronic structure may range from low-level transistor material layouts to high-level description languages. A high-level of representation may be used to design circuits and systems, using a hardware description language (HDL) such as VHDL, Verilog, SystemVerilog, SystemC, MyHDL or OpenVera. The HDL description can be transformed to a logic-level register transfer level (RTL) description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 11. The processes described by be enabled by EDA products (or EDA systems).

During system design 1114, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 1116, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification. Functional verification may include the process 1000 of FIG. 10 described above.

During synthesis and design for test 1118, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 1120, the netlist is checked for compliance with timing constraints and for correspondence with the HDL code. During design planning 1122, an overall floor plan for the integrated circuit is constructed and analyzed for timing and top-level routing.

During layout or physical implementation 1124, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 1126, the circuit function is verified at the layout level, which permits refinement of the layout design. During physical verification 1128, the layout design is checked to ensure that manufacturing constraints are correct, such as DRC constraints, electrical constraints, lithographic constraints, and that circuitry function matches the HDL design specification. During resolution enhancement 1130, the geometry of the layout is transformed to improve how the circuit design is manufactured.

During tape-out, data is created to be used (after lithographic enhancements are applied if appropriate) for production of lithography masks. During mask data preparation 1132, the 'tape-out' data is used to produce lithography masks that are used to produce finished integrated circuits.

A storage subsystem of a computer system (such as computer system 1200 of FIG. 12 described below) may be used to store the programs and data structures that are used by some or all of the EDA products described herein, and products used for development of cells for the library and for physical and logical design that use the library.

In an example, a method of replaying a simulation with a modified constraint random testbench includes: recording attributes of each constraint problem (CP) in a first series of constraint problems (CPs) solved by a constraint solver during a first simulation run to simulate operation of a design under test (DUT) with a first testbench, the recorded attributes of each CP in the first series including a pre-solution state of that CP prior to being solved by the constraint solver; mapping the recorded attributes of each CP in the first series to at least one key value set of a plurality of key value sets, each key value set of the plurality of key value sets using a different level of generalization to represent the recorded attributes of each CP mapped to that key value set; determining, by a processor and based on the mapping, a matching CP from the first series for each CP in a second series of CPs to be solved by the constraint solver during a second simulation run to simulate operation of the DUT with a second testbench, wherein the matching CP is mapped to a key value set of the plurality of key value sets that uses a lower level of generalization to represent the recorded attributes of the matching CP relative to a level of generalization used by other key value sets of the plurality of key value sets; and setting a pre-solution state of each CP in the second series to be solved by the constraint solver during the second simulation run to the pre-solution state of the matching CP determined for that CP in the second series.

In the foregoing example of the method, each CP in the respective first and second series may be generated based on constraints defined in the respective first and second testbenches. Each of the first and second testbenches may be a constrained random testbench used by a constrained random stimulus generator to generate stimulus values for a simulator to simulate operation of the DUT during the respective first and second simulation runs. The constrained random stimulus generator may include a problem generator and the constraint solver, where each CP in the respective first and second series of CPs is generated by the problem generator to be solved by the constraint solver during the respective first and second simulation runs, and where the constraint solver generates the stimulus values for the simulator based on the first and second series of CPs solved during the respective first and second simulation runs. The pre-solution state of each CP in the first series may be a random number generator (RNG) seed state of the CP prior to being solved by the constraint solver during the first simulation run. The mapping may further include: generating mapping tables corresponding to the plurality of key value sets, where each mapping table includes the recorded attributes of each CP mapped to a corresponding key value set; and sorting the mapping tables in order of increasing generalization based on the key value set corresponding to each mapping table. The determining of the matching CP may include searching each of the mapping tables for the matching CP according to the order in which the mapping tables are sorted. The second testbench may be a modified version of the first testbench, and the method may further include modifying, by the processor prior to the second simulation run, the first testbench to generate the second testbench. The recorded attributes of each CP in the first series may further include a string value representing a structure of a constraint expression tree corresponding to that CP, an integer value representing an ordered sequence of variables appearing in the constraint expression tree, and a string value representing a randomization call site for that CP.

In another example, a non-transitory computer-readable storage medium comprises stored instructions, which when executed by one or more processors, cause the one or more processors to: record attributes of each constraint problem (CP) in a first series of constraint problems (CPs) solved by a constraint solver during a first simulation run to simulate operation of a design under test (DUT) with a first testbench, the recorded attributes of each CP in the first series including a pre-solution state of that CP prior to being solved by the constraint solver; map the recorded attributes of each CP in the first series to at least one key value set of a plurality of key value sets, each key value set of the plurality of key value sets using a different level of generalization to represent the recorded attributes of each CP mapped to that key value set; determine a matching CP from the first series for each CP in a second series of CPs to be solved by the constraint solver during a second simulation run to simulate operation of the DUT with a second testbench, where the matching CP is mapped to a key value set of the plurality of key value sets that uses a lower level of generalization to represent the recorded attributes of the matching CP relative to a level of generalization used by other key value sets of the plurality of key value sets; and set a pre-solution state of each CP in the second series to be solved by the constraint solver during the second simulation run to the pre-solution state of the matching CP determined for that CP in the second series.

In the foregoing example of the non-transitory computer-readable storage medium, each of the first and second testbenches may be a constrained random testbench used by a constrained random stimulus generator to generate stimulus values for a simulator to simulate operation of the DUT during the respective first and second simulation runs, and each CP in the respective first and second series may be generated based on constraints defined in the respective first and second testbenches. The constrained random stimulus generator in this example may include a problem generator and the constraint solver, where each CP in the respective first and second series of CPs is generated by the problem generator to be solved by the constraint solver during the respective first and second simulation runs, and where the constraint solver generates the stimulus values for the simulator based on the first and second series of CPs solved during the respective first and second simulation runs. The pre-solution state of each CP in the first series may be a random number generator (RNG) seed state of the CP prior to being solved by the constraint solver during the first simulation run. The instructions, which when executed by the one or more processors, may further cause the one or more processors to: generate mapping tables corresponding to the plurality of key value sets, where each mapping table includes the recorded attributes of each CP mapped to a corresponding key value set; sort the mapping tables in order of increasing generalization based on the key value set corresponding to each mapping table; and search each of the mapping tables for the matching CP according to the order in which the mapping tables are sorted. The second testbench may be a modified version of the first testbench, and the instructions, which when executed by the one or more processors, may further cause the one or more processors to modify the first testbench to generate the second testbench prior to the second simulation run. The recorded attributes of each CP in the first series may further include a string value representing a structure of a constraint expression tree corresponding to that CP, an integer value representing an ordered sequence of variables appearing in the constraint expression tree, and a string value representing a randomization call site for that CP.

In a further example, a non-transitory computer-readable storage medium comprises stored instructions, which when executed by one or more processors, cause the one or more processors to: record, during a first simulation run for simulating operation of a design under test (DUT) with a first testbench, an instance of each constraint problem (CP) in a first series of constraint problems (CPs) solved by a constraint solver during the first simulation run as an event with corresponding event attributes, the event attributes including a pre-solution state of the CP corresponding to the event; map the recorded event for each CP instance in the first series to at least one key value set of a plurality of key value sets, each key value set using a different level of generalization to represent the corresponding event attributes of each recorded event in that key value set; determine, for each instance of a CP in a second series of CPs to be solved by the constraint solver during a second simulation run for simulating operation of the DUT with a second testbench, at least one recorded event for a matching CP instance from the first series based on the mapping, where the at least one recorded event is mapped to a key value set of the plurality of key value sets that uses a lower level of generalization to represent the corresponding event attributes of the at least one recorded event relative to a level of generalization used by other key value sets of the plurality of key value sets; and set, during the second simulation cycle, a pre-solution state of each CP instance in the second series to be solved by the constraint solver to the pre-solution state of the matching CP instance.

In the foregoing example of the second non-transitory computer-readable storage medium, each of the first and second testbenches may be a constrained random testbench used by a constrained random stimulus generator to generate stimulus values for a simulator to simulate operation of the DUT during the respective first and second simulation runs, and each CP instance in the respective first and second series may be generated based on constraints defined in the respective first and second testbenches. The constrained random stimulus generator in this example may include a problem generator and the constraint solver, where each CP instance in the respective first and second series is generated by the problem generator to be solved by the constraint solver during the respective first and second simulation runs, and where the constraint solver generates the stimulus values for the simulator based on the first and second series of CP instances solved during the respective first and second simulation runs. The pre-solution state of each CP instance in the first series may be a random number generator (RNG) seed state of the CP instance prior to being solved by the constraint solver during the first simulation run.

Figure 12:
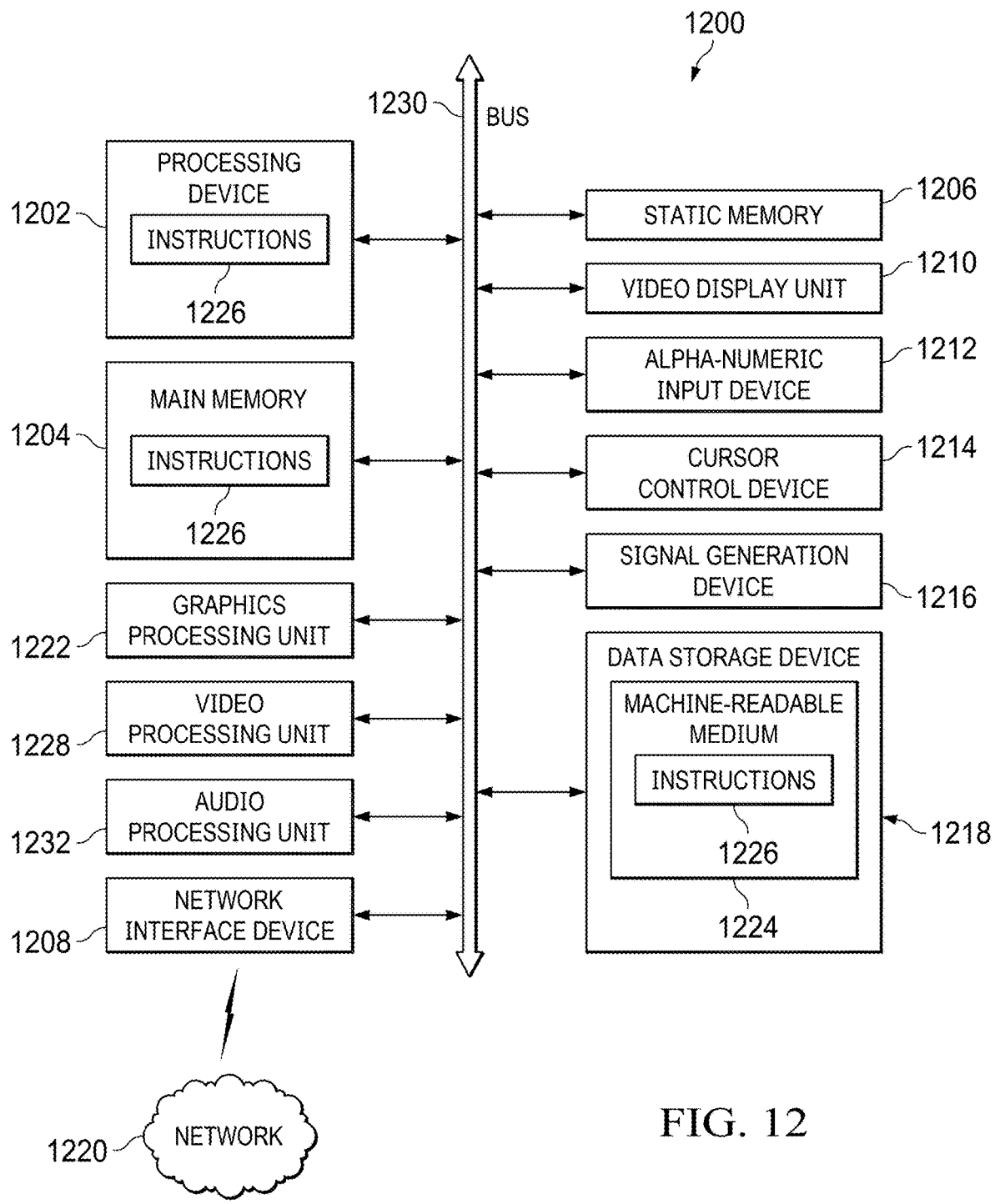
FIG. 12 is a diagram of an example computer system in which embodiments of the present disclosure may be implemented.

FIG. 12 illustrates an example machine of a computer system 1200 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1200 includes a processing device 1202, a main memory 1204 (e.g., read-only memory (ROM), flash memory, dynamic random access memory (DRAM) such as synchronous DRAM (SDRAM), a static memory 1206 (e.g., flash memory, static random access memory (SRAM), etc.), and a data storage device 1218, which communicate with each other via a bus 1230.

Processing device 1202 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 1202 may be configured to execute instructions 1226 for performing the operations and steps described herein.

The computer system 1200 may further include a network interface device 1208 to communicate over the network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a graphics processing unit 1222, a signal generation device 1216 (e.g., a speaker), graphics processing unit 1222, video processing unit 1228, and audio processing unit 1232.

The data storage device 1218 may include a machine-readable storage medium 1224 (also known as a non-transitory computer-readable storage medium) on which is stored one or more sets of instructions 1226 or software embodying any one or more of the methodologies or functions described herein. The instructions 1226 may also reside, completely or at least partially, within the main memory 1204 and/or within the processing device 1202 during execution thereof by the computer system 1200, the main memory 1204 and the processing device 1202 also constituting machine-readable storage media.

In some implementations, the instructions 1226 include instructions to implement functionality corresponding to the present disclosure. While the machine-readable storage medium 1224 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1202 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a non-transitory computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable storage medium having stored thereon instructions, which may be used to program a computer system (or other electronic devices) to perform a process according to the present disclosure. A machine-readable storage medium includes any mechanism for storing information in a form readable by a machine (e.g., a computer). For example, a machine-readable (e.g., a computer-readable) storage medium includes a machine-readable (e.g., a computer-readable) storage medium such as a read only memory (ROM), random access memory (RAM), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:
    recording attributes of each constraint problem (CP) in a first series of constraint problems (CPs) solved by a constraint solver during a first simulation run to simulate operation of a design under test (DUT) with a first testbench, the recorded attributes of each CP in the first series including a pre-solution state of that CP prior to being solved by the constraint solver;
    mapping the recorded attributes of each CP in the first series to at least one key value set of a plurality of key value sets, each key value set of the plurality of key value sets using a different level of generalization to represent the recorded attributes of each CP mapped to that key value set;
    determining, by a processor and based on the mapping, a matching CP from the first series for each CP in a second series of CPs to be solved by the constraint solver during a second simulation run to simulate operation of the DUT with a second testbench, wherein the matching CP is mapped to a key value set of the plurality of key value sets that uses a lower level of generalization to represent the recorded attributes of the matching CP relative to a level of generalization used by other key value sets of the plurality of key value sets; and
    setting a pre-solution state of each CP in the second series to be solved by the constraint solver during the second simulation run to the pre-solution state of the matching CP determined for that CP in the second series.

2. The method of claim 1, wherein each CP in the respective first and second series is generated based on constraints defined in the respective first and second testbenches.

3. The method of claim 1, wherein each of the first and second testbenches is a constrained random testbench used by a constrained random stimulus generator to generate stimulus values for a simulator to simulate operation of the DUT during the respective first and second simulation runs.

4. The method of claim 3, wherein the constrained random stimulus generator includes a problem generator and the constraint solver, wherein each CP in the respective first and second series of CPs is generated by the problem generator to be solved by the constraint solver during the respective first and second simulation runs, and wherein the constraint solver generates the stimulus values for the simulator based on the first and second series of CPs solved during the respective first and second simulation runs.

5. The method of claim 4, wherein the pre-solution state of each CP in the first series is a random number generator (RNG) seed state of the CP prior to being solved by the constraint solver during the first simulation run.

6. The method of claim 1, wherein the mapping further comprises:
generating mapping tables corresponding to the plurality of key value sets, wherein each mapping table includes the recorded attributes of each CP mapped to a corresponding key value set; and
sorting the mapping tables in order of increasing generalization based on the key value set corresponding to each mapping table.

7. The method of claim 6, wherein determining comprises searching each of the mapping tables for the matching CP according to the order in which the mapping tables are sorted.

8. The method of claim 1, wherein the second testbench is a modified version of the first testbench, and wherein the method further comprises: modifying, by the processor prior to the second simulation run, the first testbench to generate the second testbench.

9. The method of claim 1, wherein the recorded attributes of each CP in the first series further include a string value representing a structure of a constraint expression tree corresponding to that CP, an integer value representing an ordered sequence of variables appearing in the constraint expression tree, and a string value representing a randomization call site for that CP.

10. A non-transitory computer-readable storage medium comprising stored instructions, which when executed by one or more processors, cause the one or more processors to:
record attributes of each constraint problem (CP) in a first series of constraint problems (CPs) solved by a constraint solver during a first simulation run to simulate operation of a design under test (DUT) with a first testbench, the recorded attributes of each CP in the first series including a pre-solution state of that CP prior to being solved by the constraint solver;
map the recorded attributes of each CP in the first series to at least one key value set of a plurality of key value sets, each key value set of the plurality of key value sets using a different level of generalization to represent the recorded attributes of each CP mapped to that key value set;
determine a matching CP from the first series for each CP in a second series of CPs to be solved by the constraint solver during a second simulation run to simulate operation of the DUT with a second testbench, wherein the matching CP is mapped to a key value set of the plurality of key value sets that uses a lower level of generalization to represent the recorded attributes of the matching CP relative to a level of generalization used by other key value sets of the plurality of key value sets; and
set a pre-solution state of each CP in the second series to be solved by the constraint solver during the second simulation run to the pre-solution state of the matching CP determined for that CP in the second series.

11. The non-transitory computer-readable storage medium of claim 10, wherein each of the first and second testbenches is a constrained random testbench used by a constrained random stimulus generator to generate stimulus values for a simulator to simulate operation of the DUT during the respective first and second simulation runs, and wherein each CP in the respective first and second series is generated based on constraints defined in the respective first and second testbenches.

12. The non-transitory computer-readable storage medium of claim 11, wherein the constrained random stimulus generator includes a problem generator and the constraint solver, wherein each CP in the respective first and second series of CPs is generated by the problem generator to be solved by the constraint solver during the respective first and second simulation runs, and wherein the constraint solver generates the stimulus values for the simulator based on the first and second series of CPs solved during the respective first and second simulation runs.

13. The non-transitory computer-readable storage medium of claim 12, wherein the pre-solution state of each CP in the first series is a random number generator (RNG) seed state of the CP prior to being solved by the constraint solver during the first simulation run.

14. The non-transitory computer-readable storage medium of claim 10, wherein the instructions, which when executed by the one or more processors, further cause the one or more processors to:
generate mapping tables corresponding to the plurality of key value sets, wherein each mapping table includes the recorded attributes of each CP mapped to a corresponding key value set;
sort the mapping tables in order of increasing generalization based on the key value set corresponding to each mapping table; and
search each of the mapping tables for the matching CP according to the order in which the mapping tables are sorted.

15. The non-transitory computer-readable storage medium of claim 10, wherein the second testbench is a modified version of the first testbench, and wherein the instructions, which when executed by the one or more processors, further cause the one or more processors to:
modify the first testbench to generate the second testbench prior to the second simulation run.

16. The non-transitory computer-readable storage medium of claim 10, wherein the recorded attributes of each CP in the first series further include a string value representing a structure of a constraint expression tree corresponding to that CP, an integer value representing an ordered sequence of variables appearing in the constraint expression tree, and a string value representing a randomization call site for that CP.

17. A non-transitory computer-readable storage medium comprising stored instructions, which when executed by one or more processors, cause the one or more processors to:
record, during a first simulation run for simulating operation of a design under test (DUT) with a first testbench, an instance of each constraint problem (CP) in a first series of constraint problems (CPs) solved by a constraint solver during the first simulation run as an event with corresponding event attributes, the event attributes including a pre-solution state of the CP corresponding to the event;

map the recorded event for each CP instance in the first series to at least one key value set of a plurality of key value sets, each key value set using a different level of generalization to represent the corresponding event attributes of each recorded event in that key value set;

determine, for each instance of a CP in a second series of CPs to be solved by the constraint solver during a second simulation run for simulating operation of the DUT with a second testbench, at least one recorded event for a matching CP instance from the first series based on the mapping, wherein the at least one recorded event is mapped to a key value set of the plurality of key value sets that uses a lower level of generalization to represent the corresponding event attributes of the at least one recorded event relative to a level of generalization used by other key value sets of the plurality of key value sets; and set, during the second simulation cycle, a pre-solution state of each CP instance in the second series to be solved by the constraint solver to the pre-solution state of the matching CP instance.

18. The non-transitory computer-readable storage medium of claim 17, wherein each of the first and second testbenches is a constrained random testbench used by a constrained random stimulus generator to generate stimulus values for a simulator to simulate operation of the DUT during the respective first and second simulation runs, and wherein each CP instance in the respective first and second series is generated based on constraints defined in the respective first and second testbenches.

19. The non-transitory computer-readable storage medium of claim 18, wherein the constrained random stimulus generator includes a problem generator and the constraint solver, wherein each CP instance in the respective first and second series is generated by the problem generator to be solved by the constraint solver during the respective first and second simulation runs, and wherein the constraint solver generates the stimulus values for the simulator based on the first and second series of CP instances solved during the respective first and second simulation runs.

20. The non-transitory computer-readable storage medium of claim 19, wherein the pre-solution state of each CP instance in the first series is a random number generator (RNG) seed state of the CP instance prior to being solved by the constraint solver during the first simulation run.

* * * * *